US 12,539,865 B2

(12) United States Patent
Sakamoto et al.

(10) Patent No.: US 12,539,865 B2
(45) Date of Patent: Feb. 3, 2026

(54) VEHICLE GUIDANCE DEVICE

(71) Applicant: TOYOTA JIDOSHA KABUSHIKI KAISHA, Toyota (JP)

(72) Inventors: Shoji Sakamoto, Shizuoka-ken (JP); Kazumi Tsuchiya, Gotemba (JP); Makoto Matsushita, Ichinomiya (JP); Takeshi Takemoto, Nagoya (JP); Shunsuke Sagara, Nisshin (JP); Hideaki Shiraishi, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 121 days.

(21) Appl. No.: 18/486,509

(22) Filed: Oct. 13, 2023

(65) Prior Publication Data
US 2024/0208518 A1 Jun. 27, 2024

(30) Foreign Application Priority Data

Dec. 21, 2022 (JP) ................. 2022-204737

(51) Int. Cl.
*B60W 50/029* (2012.01)
*B60W 40/068* (2012.01)
*B60W 50/02* (2012.01)
*B60W 60/00* (2020.01)
*G01C 21/34* (2006.01)

(52) U.S. Cl.
CPC ........ *B60W 50/029* (2013.01); *B60W 40/068* (2013.01); *B60W 50/0205* (2013.01);
(Continued)

(58) Field of Classification Search
CPC .......... B60W 50/029; B60W 60/0059; B60W 40/068; B60W 50/0205; B60W 2556/50;
(Continued)

(56) References Cited

U.S. PATENT DOCUMENTS 9,174,641 B2 * 11/2015 Fritz ................. B60W 30/0956
10,583,843 B2 * 3/2020 Tamagaki ............. B60W 40/08
(Continued)

FOREIGN PATENT DOCUMENTS

DE 102015118101 A1 * 5/2016 ............. B60K 28/10
JP 2017-030518 A 2/2017
(Continued)

OTHER PUBLICATIONS

Heesen, Matthias et al. "Interaction Design of Automatic Steering for Collision Avoidance: Challenges and Potentials of Driver Decoupling." IET intelligent transport systems 9.1 (2015): 95-104. Web. (Year: 2015).*

*Primary Examiner* — Ramya P Burgess
*Assistant Examiner* — Keith A von Volkenburg
(74) *Attorney, Agent, or Firm* — SoraIP, Inc.

(57) ABSTRACT

A braking function recognition unit that recognizes a state of a braking device capable of applying a braking force to a vehicle, a first reception unit that receives satellite data from the artificial satellite, a determination unit that determines an emergency evacuation location based on the satellite data, and a driving assistance control unit that causes a vehicle traveling toward the emergency evacuation location to execute driving assistance control when the braking function recognition unit recognizes that there is an abnormality in the braking device.

11 Claims, 5 Drawing Sheets

(52) U.S. Cl.
CPC . B60W 60/0059 (2020.02); *B60W 2050/0292* (2013.01); *B60W 2520/28* (2013.01); *B60W 2552/40* (2020.02); *B60W 2556/50* (2020.02); *B60W 2556/65* (2020.02); *G01C 21/3461* (2013.01)

(58) Field of Classification Search
CPC ......... B60W 2552/40; B60W 2556/65; B60W 2050/0292; B60W 2520/28; G01C 21/3461
USPC .................................................. 701/29, 29.2
See application file for complete search history.

(56) References Cited

U.S. PATENT DOCUMENTS

| | | | | |
|---|---|---|---|---|
| 10,829,124 | B2 * | 11/2020 | Narita | B60W 50/14 |
| 2015/0283984 | A1 * | 10/2015 | Uno | B60T 8/175 |
| | | | | 701/71 |
| 2018/0229736 | A1 * | 8/2018 | Narita | H04W 4/44 |
| 2019/0004513 | A1 | 1/2019 | Chiba et al. | |
| 2021/0245741 | A1 * | 8/2021 | Asakura | G08G 1/0965 |
| 2021/0339798 | A1 | 11/2021 | Nakata | |
| 2022/0194407 | A1 | 6/2022 | Fukaya | |
| 2023/0278557 | A1 * | 9/2023 | Bando | B60W 40/068 |
| | | | | 701/93 |
| 2023/0373527 | A1 * | 11/2023 | Münch | B60W 60/0015 |
| 2024/0111515 | A1 * | 4/2024 | Kyoshima | B60W 30/06 |
| 2024/0274015 | A1 * | 8/2024 | Putney | G08G 1/22 |
| 2024/0420524 | A1 * | 12/2024 | Chen | G07C 5/0891 |

FOREIGN PATENT DOCUMENTS

| | | | | |
|---|---|---|---|---|
| JP | 2017-223467 | A | | 12/2017 |
| JP | 2019156330 | A | * | 9/2019 ........... G05D 1/0011 |
| JP | 2021-172316 | A | | 11/2021 |
| JP | 2022-098967 | A | | 7/2022 |

* cited by examiner

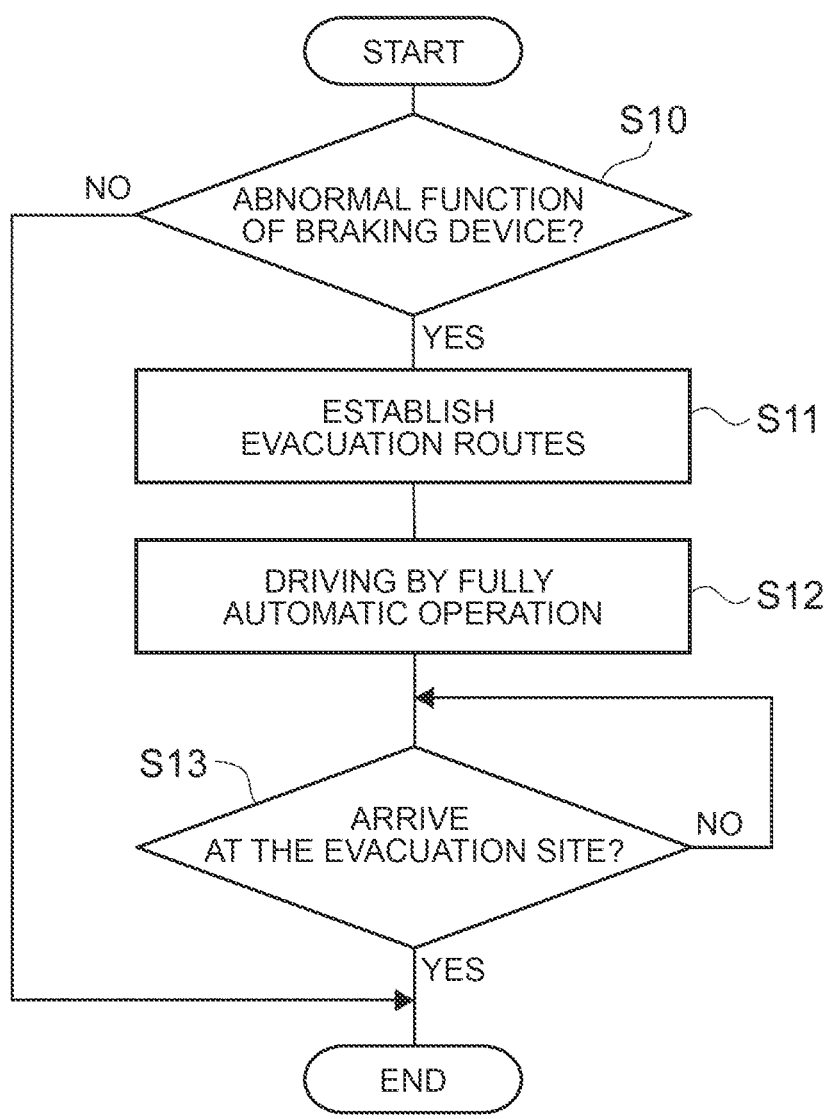

VEHICLE GUIDANCE DEVICE

CROSS-REFERENCE TO RELATED APPLICATION

This application claims priority to Japanese Patent Application No. 2022-204737 filed on Dec. 21, 2022, incorporated herein by reference in its entirety.

BACKGROUND

1. Technical Field

The present disclosure relates to a vehicle guidance device.

2. Description of Related Art

Japanese Unexamined Patent Application Publication No. 2017-223467 (JP 2017-223467 A) discloses an present disclosure in which, when a failure occurs in a vehicle, the vehicle is guided to, for example, a repair factory by using a navigation system and driving assistance control.

SUMMARY

According to the present disclosure of JP 2017-223467 A, it is difficult to guide the vehicle to an appropriate emergency evacuation site when an abnormality occurs in the braking device of the vehicle that is traveling.

In view of the above, it is an object of the present disclosure to provide a vehicle guidance device capable of guiding a vehicle in which an abnormality has occurred in a braking device to an appropriate emergency evacuation site.

A vehicle guidance device according to an aspect of the present disclosure includes: a braking function recognition unit for recognizing a state of a braking device able to apply a braking force to a vehicle; a first reception unit for receiving satellite data from an artificial satellite; a determination unit for determining an emergency evacuation site based on the satellite data; and a driving assistance control unit for causing the vehicle traveling toward the emergency evacuation site to execute driving assistance control, when the braking function recognition unit recognizes that there is an abnormality in the braking device.

The vehicle guidance device according to the aspect of the present disclosure includes a driving assistance control unit for causing the vehicle traveling toward the emergency evacuation site determined by the determination unit based on the satellite data to execute driving assistance control, when the braking function recognition unit recognizes that there is an abnormality in the braking device. Therefore, in the vehicle guidance device according to the aspect of the present disclosure, when an abnormality occurs in the braking device, the vehicle is moved to the emergency evacuation site determined based on the satellite data. By using the satellite data, the emergency evacuation site can be determined considering the congestion condition of the road. Therefore, the vehicle guidance device according to the aspect of the present disclosure can guide a vehicle in which an abnormality has occurred in the braking device to an appropriate emergency evacuation site.

In the vehicle guidance device according to the aspect of the present disclosure, the determination unit may determine the emergency evacuation site based on the satellite data and image information acquired by a camera mounted on a vehicle group different from the vehicle.

According to the above configuration, the determination unit determines the emergency evacuation site based on the satellite data and image information acquired by a camera mounted on a vehicle group. Therefore, with the above configuration, the vehicle guidance device can guide a vehicle in which an abnormality has occurred in the braking device to a more appropriate emergency evacuation site.

The vehicle guidance device according to the aspect of the present disclosure, may further include a second reception unit for receiving vehicle-related information from a data reception device for generating the vehicle-related information based on data acquired from a sensor of a vehicle group different from the vehicle. The determination unit may determine the emergency evacuation site based on the vehicle-related information and the satellite data.

According to the above configuration, the second reception unit receives vehicle-related information from a data reception device for generating the vehicle-related information based on data acquired from a sensor of a vehicle group different from the vehicle. Further, the determination unit determines the emergency evacuation site based on the vehicle-related information and the satellite data. Therefore, with the above configuration the vehicle guidance device can guide a vehicle in which an abnormality has occurred in the braking device to a more appropriate emergency evacuation site.

In the vehicle guidance device according to the aspect of the present disclosure, the vehicle-related information may include at least one of wheel speed information and information on a friction coefficient between a road and a wheel.

According to the above configuration, the vehicle-related information includes at least one of wheel speed information and information on a friction coefficient between a road and a wheel. Therefore, with the above configuration, the determination unit can select a road on which the vehicle can easily travel without using the braking device as a road for guiding the vehicle to the emergency evacuation site. Therefore, the vehicle guidance device can guide a vehicle in which an abnormality has occurred in the braking device to a more appropriate emergency evacuation site.

In the vehicle guidance device according to the aspect of the present disclosure, the driving assistance control unit may execute the driving assistance control based on the satellite data without using information acquired by an obstacle detection sensor provided in the vehicle.

With the above configuration, even when the vehicle does not include the obstacle detection sensor or even when there is a failure in the obstacle detection sensor, the driving assistance control unit can execute the driving assistance control.

As described above, the vehicle guidance device according to the present disclosure has an excellent effect that a vehicle in which an abnormality has occurred in the braking device can be guided to an appropriate emergency evacuation site.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 6 is a flow chart illustrating a process executed by CPU of ECU.

DETAILED DESCRIPTION OF EMBODIMENTS

Figure 1:
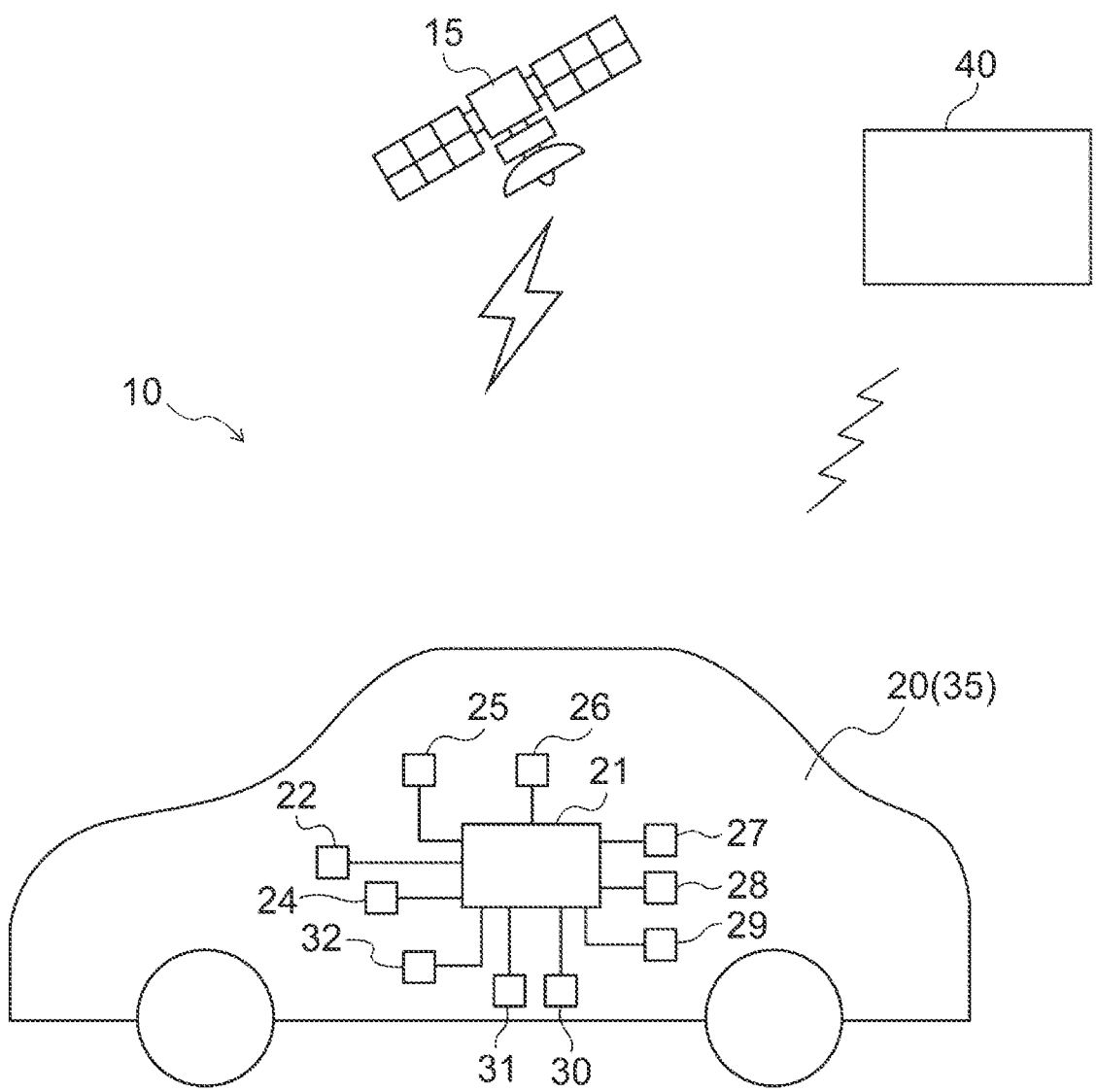
FIG. 1 is a diagram illustrating a vehicle guidance system including a vehicle guidance device and an artificial satellite according to an embodiment.

Hereinafter, an embodiment of a vehicle 20 including a vehicle guidance device according to the present disclosure will be described with reference to the drawings. As shown in FIG. 1, vehicle 20 is part of vehicle guidance system 10. The vehicle guidance system 10 includes an artificial satellite 15, a vehicle 20, a plurality of vehicles 35 different from the vehicle 20, and an external server (data receiving device) 40. Note that each vehicle 35 in this specification has the same specifications as the vehicle 20 described below.

The artificial satellite 15 shown in FIG. 1 circulates on the earth's satellite orbit at a predetermined cycle, and photographs the earth and the sky. Therefore, the satellite data, which is the captured data acquired by the artificial satellite 15, includes, for example, geographic information on the ground and image data representing road information. The image data representing the geographic information includes, for example, image data representing the ground and the sea. Further, the image data representing the ground includes, for example, image data representing mountains, rivers, buildings, fields, and paddies. The image data representing the road information includes image data representing the position and shape of the road, and image data representing the traffic amount information (information regarding the number of vehicles and the vehicle speed of each vehicle).

The vehicle 20 includes an Electronic Control Unit (ECU) 21 as shown in FIG. 1, a display 22 having a touch panel, a satellite data receiver (first reception unit) 24, a Global Navigation Satellite System (GNSS) receiver 25, a drive source 26, a steering device 27, a braking device 28, a camera 29, a steering angle sensor 30, a steering torque sensor 31, and a driving assistance operation device 32. The display 22, the satellite-data receiver 24, GNSS receiver 25, the drive source 26, the steering device 27, the braking device 28, the camera (sensor) 29, the steering angle sensor 30, the steering torque sensor 31, and the driving assistance operation device 32 are connected to ECU 21.

As described below, the display 22 can display various images. The satellite data receiver 24 is capable of receiving satellite data acquired by the artificial satellite 15 and transmitted toward the ground. GNSS receiver 25 receives GNSS signals transmitted from GNSS satellites, and thereby acquires information (hereinafter, referred to as "position information") related to the position at which the vehicles 20 are traveling.

The drive source 26 includes at least one of an internal combustion engine and an electric motor. The driving force generated by the driving source is transmitted to two driving wheels (for example, front wheels) of the vehicle 20. The steering device 27 is an Electric Power Steering having a steering wheel (not shown). The braking device 28 can apply a braking force to four wheels provided in the vehicle 20. The camera 29 captures an image of a subject located around the vehicle 20.

The steering angle sensor 30 acquires the steering angle of the steering wheel. The steering torque sensor 31 acquires the steering torque applied to the steering shaft.

The driving assistance operation device 32 is provided in, for example, an instrument panel of the vehicle 20.

Figure 2:
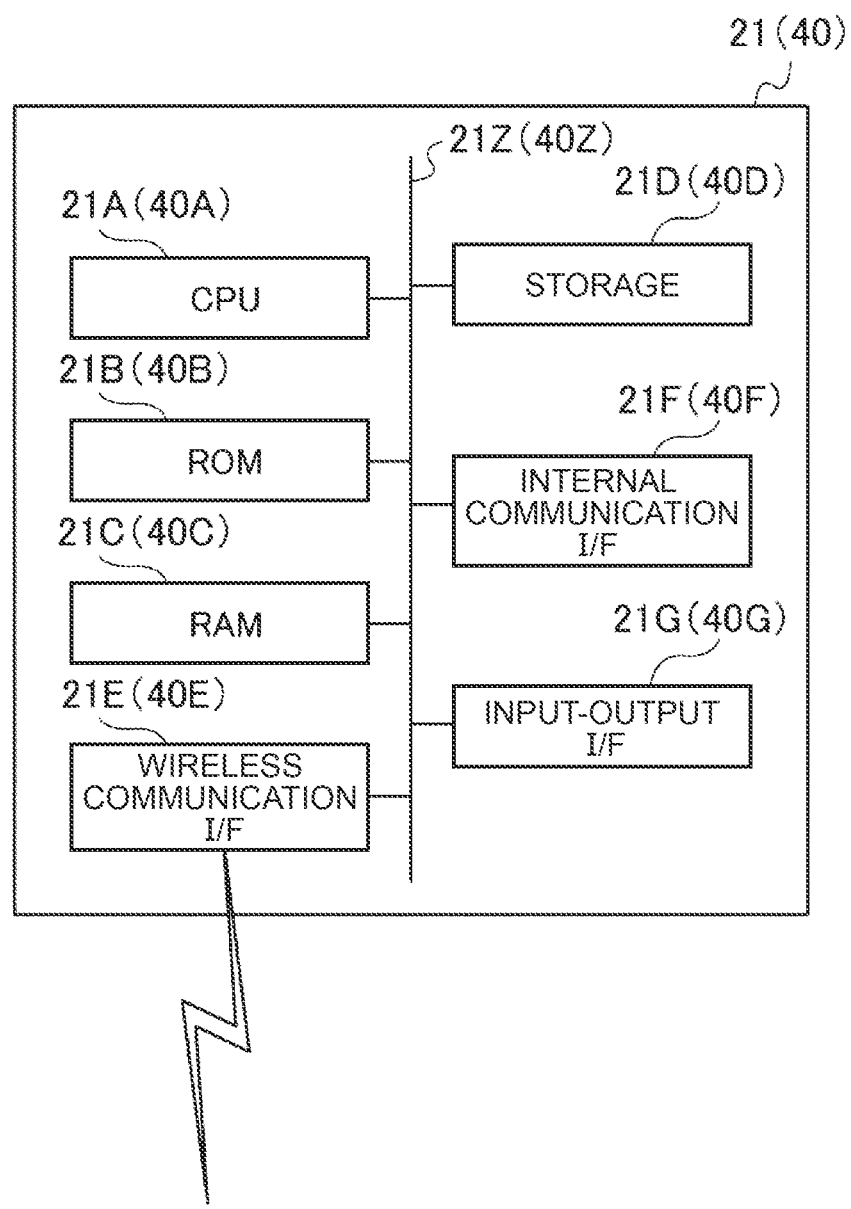
FIG. 2 is a control diagram of ECU and external servers of the vehicles shown in FIG. 1.

As illustrated in FIG. 2, ECU 21 includes a Central Processing Unit (CPU) (processor) 21A, Read Only Memory (ROM) 21B, Random Access Memory (RAM) 21C, a storage 21D, a wireless communication Interface (I/F) (second receiver) 21E, an internal communication I/F 21F, and an input/output I/F 21G. CPU 21A, ROM 21B, RAM 21C, the storage 21D, the wireless communication I/F 21E, the internal communication I/F 21F, and the input/output I/F 21G are communicably connected to each other via an internal bus 21Z. ECU 21 can acquire the time-related information from the timer. ECU 21 (input/output I/F 21G) is connected to a display 22, a satellite-data receiver 24, a GNSS receiver 25, a drive source 26, a steering device 27, a braking device 28, a camera 29, a steering angle sensor 30, a steering torque sensor 31, and a driving assistance operation device 32.

CPU 21A is a central processing unit that executes various programs and controls each unit. CPU 21A reads a program from a ROM 21B or a storage 21D, and executes the program using RAM 21C as a working area. CPU 21A performs control of respective configurations and various arithmetic processes in accordance with programs recorded in a ROM 21B or a storage 21D.

ROM 21B stores various programs and various data. RAM 21C temporarily stores a program/data as a working area. The storage 21D is constituted by a storage device such as a Hard Disk Drive (HDD) or a Solid State Drive (SSD), and stores various programs and various data.

A wireless communication I/F 21E is an interface for wirelessly communicating with various devices. As the wireless communication I/F 21E, a communication standard such as Bluetooth (registered trademark) or Wi-Fi (registered trademark) is used. The wireless communication I/F 21E can wirelessly communicate with the external servers 40, for example.

The internal communication I/F 21F is an interface for connecting to an ECU different from ECU 21 provided in the vehicles 20 via an external bus.

The input/output I/F 21G is, for example, an interface for communicating with the display 22, the satellite-data receiver 24, GNSS receiver 25, the drive source 26, the steering device 27, the braking device 28, the camera 29, the steering angle sensor 30, the steering torque sensor 31, and the driving assistance operation device 32.

Figure 3:
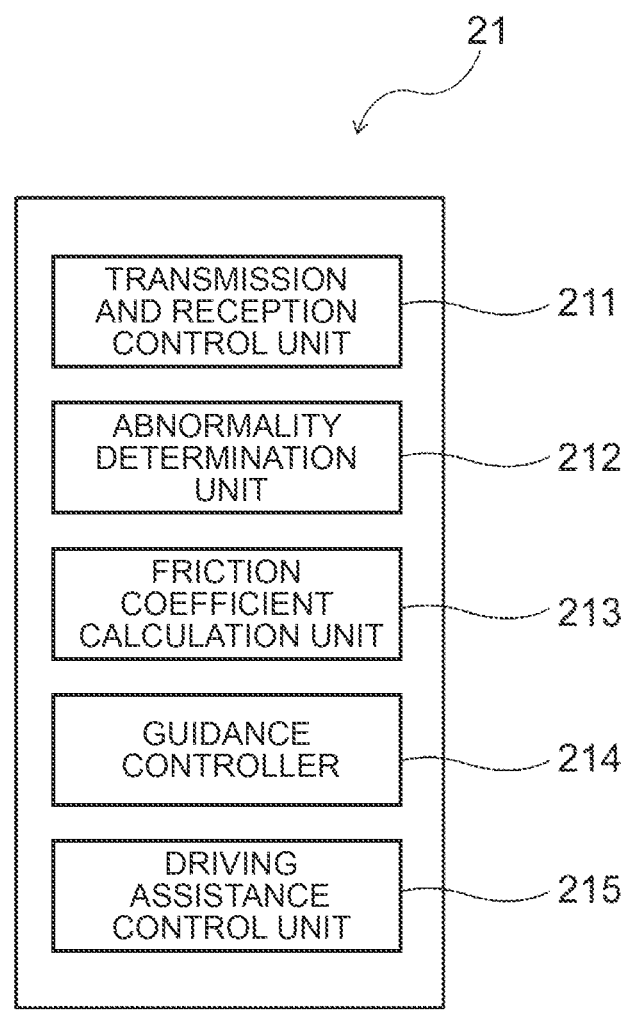
FIG. 3 is a functional diagram of ECU shown in FIG. 2.

FIG. 3 is a block-diagram illustrating an exemplary functional configuration of ECU 21. ECU 21 includes, as functional configurations, a transmission and reception control unit 211, an abnormality determination unit (braking function recognition unit) 212, a friction-coefficient calculation unit 213, a guidance control unit (determination unit) 214, and a driving assistance control unit 215. The transmission and reception control unit 211, the abnormality determination unit 212, the friction-coefficient calculation unit 213, the guidance control unit 214, and the driving assistance control unit 215 are realized by CPU 21A reading out and executing a program stored in ROM 21B.

The transmission and reception control unit 211 controls the wireless communication I/F 21E, the internal communication I/F 21F, the satellite-data receiver 24, and GNSS receiver 25.

The abnormality determination unit 212 determines whether or not there is an abnormality in each device of the vehicle 20. For example, the abnormality determination unit 212 determines whether or not there is an abnormality in the function of the braking device 28. For example, when the braking device 28 does not generate a braking force when a brake pedal (not shown) is depressed, the abnormality determination unit 212 determines that there is an abnormality in the function of the braking device 28.

The friction coefficient calculation unit 213 calculates a friction coefficient between each wheel of the vehicle 20 and the road surface based on the detection values (data) of the steering angle sensor 30 and the steering torque sensor 31. Such a calculation method is well known, for example, as disclosed in Japanese Unexamined Patent Application Publication No. 2021-172316 A (JP 2021-172316 A).

The guidance control unit 214 controls a navigation system mounted on the vehicle 20. Furthermore, the guidance control unit 214 causes the display 22 to display various images including images represented by satellite data (captured data). Further, the satellite data receiver 24 performs image analysis on the satellite data received from the artificial satellite 15, so that the guidance control unit 214 acquires the road information and the geographic information from the satellite data.

Figure 5:
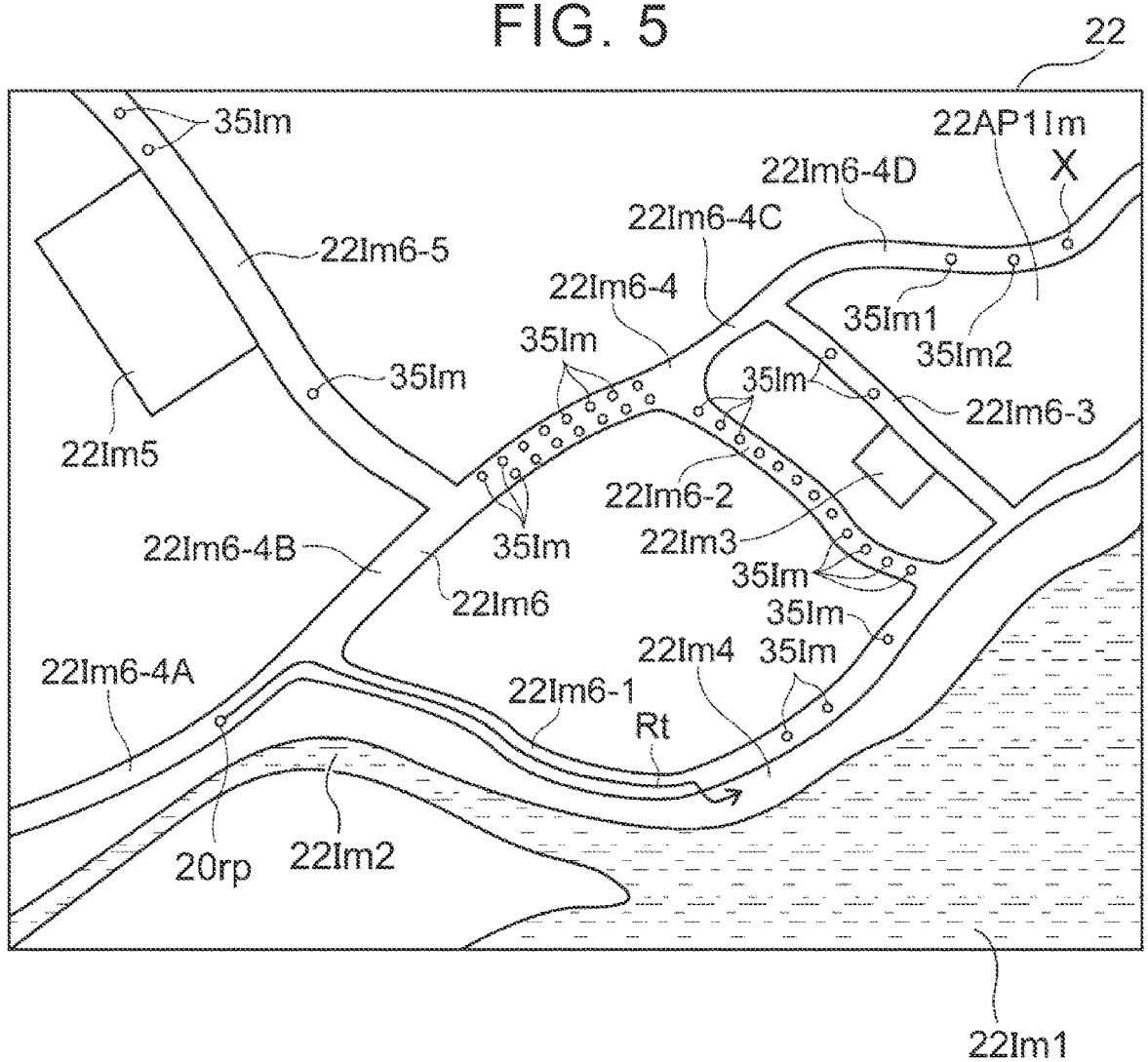
FIG. 5 is a diagram representing a display of a vehicle.

A map-image 22AP1Im generated based on the satellite-data is displayed on the display 22 illustrated in FIG. 5. The map-image 22AP1Im represents a predetermined area including the present position of the vehicles 20. The map image 22AP1Im includes, for example, a sea image 22Im1 representing a sea, a river image 22Im2 representing a river, an empty land image 22Im3 representing an empty land, a sandy beach image 22Im4 representing a sandy beach, a field image 22Im5 representing a field, a road image 22Im6 representing a road, and a vehicle image 35Im representing the vehicle 35. Further, the road image 22Im6 includes road image 22Im6-1, 22Im6-2, 22Im6-3, 22Im6-4, 22Im6-5. The road images 22Im6-1 represent roads extending along the sea and rivers. The road image 22Im6-2, 22Im6-3 respectively represents two roads which are connected to the road image 22Im6-1 and which are substantially parallel to each other. The road image 22Im6-4 represents a road connected to the road represented by the road image 22Im6-1, 22Im6-2, 22Im6-3. Further, the road image 22Im6-4 includes road image 22Im6-4A, 22Im6-4B, 22Im6-4C, 22Im6-4D. Road image 22Im6-1 and road image 22Im6-2 are connected to both ends of the road image 22Im6-4B. Road image 22Im6-2 and road image 22Im6-3 are connected to both ends of the road image 22Im6-4C. The road image 22Im6-5 represents a road that connects to the road image 22Im6-4B. A circle (0) indicated by reference numeral 20rp in FIG. 5 indicates the present position of the vehicle 20. The guidance control unit 214 recognizes the present position 20rp by using the position information and causes the display 22 to display images representing the present position 20rp.

Furthermore, the guidance control unit 214 recognizes the traffic amount in the road represented by the road picture 22Im6-1, 22Im6-2, 22Im6-3, 22Im6-4, 22Im6-5 based on the traffic amount information included in the road information of the satellite data. For example, as illustrated in FIG. 5, the guidance control unit 214 determines that the traffic volume of the vehicle on the road represented by the road image 22Im6-2 and the road image 22Im6-4B is large when the number of the vehicle images 35Im of the road represented by the road image 22Im6-2 and the road represented by the road image 22Im6-4B is large. On the other hand, as illustrated in FIG. 5, the guidance control unit 214 determines that the traffic volume of the vehicle on the road indicated by the road image 22Im6-3, 22Im6-4A, 22Im6-4C, 22Im6-4D is small when the number of vehicle image 35Im on the road indicated by the road image 22Im6-3, 22Im6-4A, 22Im6-4C, 22Im6-4D is small.

Further, when the abnormality determination unit 212 determines that there is an abnormality in the function of the braking device 28 of the vehicle 20 during traveling, the guidance control unit 214 determines a candidate of an appropriate emergency evacuation location for the vehicle 20 based on the satellite data. That is, the guidance control unit 214 determines a candidate place where the vehicle 20 can smoothly stop without using the braking force. For example, the vacant land represented by the vacant land image 22Im3, the sandy beach represented by the sandy beach image 22Im4, and the field representing the field image 22Im5 are places where the vehicles 20 can easily stop without using the braking force.

When the vehicle 20 moves from the present position 20rp to the vacant place represented by the vacant place image 22Im3, the vehicle 20 passes through the respective roads represented by the road image 22Im6-4A, 22Im6-1, 22Im6-3. As can be seen from FIG. 5, the traffic on these roads is small. Therefore, the guidance control unit 214 indicates that the vehicle 20 can travel to the free ground without using a braking force, and can stop smoothly without using a braking force on the free ground. It is determined.

When the vehicle 20 moves from the present position 20rp to the sandy beach represented by the sandy beach image 22Im4, the vehicle 20 passes through the respective roads represented by the road image 22Im6-4A and the road image 22Im6-1. As can be seen from FIG. 5, the traffic on these roads is small. Therefore, the guidance control unit 214 indicates that the vehicle 20 can travel to the sand beach without using a braking force, and can stop smoothly without using a braking force on the sand beach. It is determined.

When the vehicle 20 moves from the present position 20rp to the field representing the field image 22Im5, the vehicle 20 passes through the road represented by the road image 22Im6-4A and the road image 22Im6-5. As can be seen from FIG. 5, the traffic on these roads is small. Further, it is assumed that the wireless communication I/F 21E of the vehicle 20 acquires, from the external servers 40, slip-information, which will be described later, about the road represented by the road picture 22Im6-5. In this case, the guidance control unit 214 makes it difficult for the vehicle 20 to travel to the field without using a braking force. It is determined.

Therefore, the guidance control unit 214 determines that the free land represented by the free land image 22Im3 and the sandy beach represented by the sandy beach image 22Im4 are candidates for an appropriate emergency-evacuation site. Hereinafter, the information on the candidate of the emergency evacuation location determined by the guidance control unit 214 is referred to as candidate location information.

Further, it is assumed that the wireless communication I/F 21E of the vehicle 20 acquires additional candidate location information (vehicle-related information) regarding an emergency-evacuation location, which will be described later, from the external servers 40. For example, it is assumed that a place indicated by reference numeral X in FIG. 5 is included in the additional candidate place information. When the vehicle 20 moves from the present position 20rp to the location X, the vehicle 20 passes through the respective roads represented by the road picture 22Im6-4A, 22Im6-1, 22Im6-3, 22Im6-4D. As can be seen from FIG. 5, the traffic on these roads is small. Further, it is assumed that the vehicle 20 does not acquire slip information (vehicle-related information) about these roads from the external server 40. In this case, the guidance control unit 214 indicates that the vehicle 20 can travel to the location X without using the braking force, and can stop smoothly without using the braking force at the location X. It is determined.

In this case, the guidance control unit 214 determines the priorities as the emergency-evacuation locations for the free land represented by the free land image 22Im3 included in the candidate site information, the sandy beach represented by the sandy beach image 22Im4, and the location X included in the additional candidate site information. For example, the abnormality determination unit 212 determines the priority based on the traffic volume of the road between the current position and the emergency evacuation location (candidate location), and the size and type of each emergency evacuation location (the type of the surface of the emergency evacuation location). The emergency evacuation place with the highest priority is determined by the abnormality determination unit 212 as a formal emergency evacuation place. Furthermore, the guidance control unit 214 uses the navigation system to set an evacuation travel route from the present position 20rp of the vehicle 20 to the determined emergency evacuation location. For example, when the urgent evacuation location is a sandy beach represented by the sandy beach image 22Im4, the evacuation travel route indicated by reference numeral Rt in FIG. 5 is set.

When the driving assistance operation device 32 is in ON status, the driving assistance control unit 215 causes the vehicle 20 to execute the driving assistance control of the driving levels 1 to 5 determined by Society of Automotive Engineers (SAE) by using the sensor group and the actuator group provided in the vehicle 20. Further, when the evacuation travel route is set, the driving assistance control unit 215 causes the vehicle 20 to execute the driving assistance control (fully automatic driving) of the level 5. In this case, the vehicle 20 travels to the destination of the evacuation travel route by the driving assistance control of the level 5. However, when there is an abnormality in the function of the braking device 28, the driving assistance control unit 215 executes the driving assistance control of each level without using the braking function.

The sensor group provided in the vehicle 20 includes, for example, a camera 29, a millimeter wave radar that transmits a probe wave and receives a reflected wave, and a Laser Imaging Detection and Ranging (LiDAR) that scans the front of the vehicle 20. The actuator group provided in the vehicle 20 includes a braking device 28, a steering device 27, various electric actuators for operating an internal combustion engine as a driving source, and an electric motor as a driving source.

As illustrated in FIG. 2, the external server 40 illustrated in FIG. 1 includes a CPU (processor) 40A, ROM 40B, RAM 40C, a storage 40D, a wireless communication I/F 40E, an internal communication I/F 40F, and an input/output I/F 40G as a hardware configuration. CPU 40A, ROM 40B, RAM 40C, the storage 40D, the wireless communication I/F 40E, the internal communication I/F 40F, and the input/output I/F 40G are communicably connected to each other via an internal bus 40Z. ECU 40 can acquire the time-related information from the timer.

Figure 4:
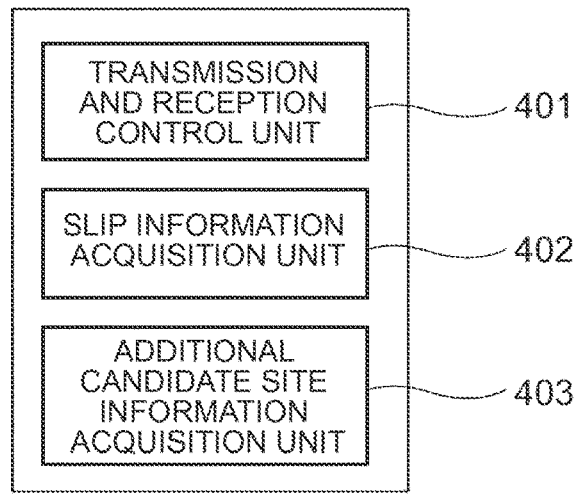
FIG. 4 is a functional block diagram of the external server shown in FIG. 2.

FIG. 4 is a block diagram illustrating an example of a functional configuration of hardware of the external server 40. The hardware of the external server 40 includes a transmission/reception control unit 401, a slip information acquisition unit 402, and an additional candidate place information acquisition unit 403 as a functional configuration. The transmission/reception control unit 401, the slip-information acquisition unit 402, and the additional candidate place information acquisition unit 403 are realized by CPU 40A reading and executing a program stored in ROM 40B.

The transmission/reception control unit 401 controls the wireless communication I/F 40E and the internal communication I/F 40F. The wireless communication I/F 40E controlled by the transmission/reception control unit 401 can wirelessly communicate with the wireless communication I/F 20E of the vehicle 20 and the vehicle 35. For example, the wireless communication I/F 40E receives information related to the frictional coefficient and captured data acquired by the cameras 29 from the wireless communication I/F 20E of the vehicle 20 and the vehicle 35.

The slip information acquisition unit 402 generates slip information on the basis of the information on the frictional coefficient between the wheels of the respective vehicles and the road surface acquired by the wireless communication I/F 40E from the vehicle 20 and the vehicle 35. When the coefficient of friction between the wheels of the vehicle and the road surface is equal to or less than a predetermined threshold value, the slip information acquisition unit 402 generates slip information. The slip information includes position information regarding a location where the friction coefficient of the corresponding vehicle becomes equal to or less than the threshold value.

The additional candidate place information acquisition unit 403 selects a location that can be an appropriate emergency-evacuation location for the vehicle 20 based on the photographed data acquired by the wireless communication I/F 40E from the vehicle 20 and the camera 29 of the vehicle 35. For example, when it is determined that a part of the location of the road represented by the code X is appropriate as an emergency evacuation location of the vehicle 20 on the basis of the photographed data acquired from the two vehicles 35 while traveling on the road represented by the road image 22Im6-4D and represented by the vehicle image 35Im1, 35Im2, the additional candidate place information acquisition unit 403 includes the location X in the additional candidate location information. For example, the additional candidate place information acquisition unit 403 causes the vehicle 20 to be stopped at the location X by causing the wheels of the vehicle 20 to touch the curbstone of the road represented by 22Im-4D at the location X based on the photographed data. In a case where it is determined "the location X is included in the additional candidate location information."

Operation and Effects

Next, the operation and effects of the present embodiment will be described.

The flow of the process performed by CPU 21A of ECU 21 will be described with reference to the flow chart of FIG. 6. CPU 21A repeatedly executes the process of the flow chart of FIG. 6 every time a predetermined period elapses.

First, in S10 (hereinafter, the characters of the steps are omitted), CPU 21A determines whether or not there is a malfunction in the function of the braking device 28.

If it is determined in S10 that it is Yes, CPU 21A proceeds to S11 and sets the evacuation travel route. When the vehicles 20 are acquiring the additional candidate place information and the slip information from the external servers 40, CPU 21A sets the evacuation travel route considering the additional candidate place information and the slip information.

In CPU 21A where S11 process is completed, the process proceeds to S12, and the driving assistance control (fully automated driving) of the level-5 is executed, and the vehicle 20 is caused to travel along the evacuation travel route by the driving assistance control.

In a CPU 21A where S12 process is completed, the process proceeds to S13, and based on the position information of the vehicle 20, it is determined whether or not the vehicle 20 has arrived at an urgent evacuation location which is a destination of the evacuation travel route.

When it is determined that S13 is Yes or when it is determined that S10 is No, CPU 21A temporarily ends the process of the flow chart of FIG. 6.

As described above, in the present embodiment, when CPU 21A (abnormality determination unit 212) recognizes that there is an abnormality in the braking device 28 of the vehicle 20, CPU 21A (guidance control unit 214, driving assistance control unit 215) causes the vehicle 20 to travel to the emergency-evacuation location determined based on the satellite data. Therefore, when an abnormality occurs in the braking device 28, the vehicle 20 is moved to the emergency evacuation place determined based on the satellite data. By using the satellite data, the emergency evacuation site can be decided considering the congestion condition of the road. Therefore, in the present embodiment, the vehicle 20 in which an abnormality has occurred in the braking device 28 can be guided to an appropriate emergency evacuation place.

Further, in the present embodiment, CPU 21A (guidance control unit 214) determines the emergency-evacuation location based on the image information acquired by the cameras 29 mounted on the respective vehicles 35 and the additional candidate location information acquired by the vehicles 20 from the external servers 40. Therefore, the vehicle 20 in which an abnormality has occurred in the braking device 28 can be guided to a more appropriate emergency evacuation place as compared with the case where the emergency evacuation place is determined without using these pieces of information.

Further, in the present embodiment, by using the slip information, a road on which the vehicle 20 is easy to travel without using the braking device 28 can be selected as a road for guiding the vehicle 20 to the emergency evacuation place.

Although the vehicle guidance device according to the embodiment has been described above, the design of the vehicle can be appropriately changed without departing from the gist of the present disclosure.

For example, the vehicle 20 and the vehicle 35 may include a wheel speed sensor that acquires the wheel speed of each wheel, and the vehicle 20 and the vehicle 35 may wirelessly transmit the acquired wheel speed information to the external server 40. In this case, the external server 40 determines whether or not slippage has occurred in the wheel by using the acquired wheel speed information. Further, the external server 40 generates slip information regarding the vehicle in which it is determined that slip has occurred. The slip information includes positional information regarding a place where a slip has occurred in the corresponding vehicle.

The external server may generate slip information based on information from the steering angle sensor 30, the steering torque sensor 31, and the wheel speed sensor.

When the candidate location information and the additional candidate location information include a plurality of emergency evacuation locations, the display 22 may display an image indicating all the emergency evacuation locations. This image is an image indicating each emergency evacuation location (image of the emergency evacuation location), and may be, for example, a character "emergency evacuation location". Further, in this case, for example, an occupant may select a formal emergency evacuation location from among a plurality of emergency evacuation locations displayed on the display 22 by operating the touch panel type display 22. In this case, the guidance control unit 214 sets an evacuation travel route connecting the current position and the formal emergency evacuation location.

When the evacuation travel route is set, the driving assistance control unit 215 may execute any one of the driving assistance control levels 1 to 4, and the vehicle 20 may travel on the evacuation travel route using the driving assistance control.

The driving assistance control unit 215 of the vehicle 20 may execute the driving assistance control by not using the information acquired by the obstacle detection sensor including the camera 29, the millimeter wave radar, and the lidar, but using the surrounding information of the vehicle 20 included in the satellite data (for example, information on a road on which the vehicle 20 is traveling, information on another vehicle and a pedestrian located in the vicinity of the vehicle 20, and the like). In this case, even if the vehicle 20 does not include the obstacle detection sensor or the obstacle detection sensor fails, the driving assistance control unit 215 can execute the driving assistance control.

What is claimed is:

1. A vehicle guidance device comprising:
a processor; and
a memory storing instructions that are executable by the processor and cause the processor to:
acquire a state of a braking device configured to apply a braking force to a host vehicle;
determine whether an abnormality is present in the braking device based on the acquired state of the braking device;
receive satellite data from an artificial satellite via a satellite data receiver;
determine an emergency evacuation site where the host vehicle is able to stop without using the braking force, based on the received satellite data in response to determining that the abnormality is present in the braking device;
determine an evacuation travel route toward the emergency evacuation site; and
cause the host vehicle to travel toward the emergency evacuation site along the evacuation travel route using fully automatic driving assistance control executed without utilizing a braking function of the braking device.

2. The vehicle guidance device according to claim 1, wherein the emergency evacuation site is determined based on the satellite data and image information acquired by cameras of vehicles other than the host vehicle.

3. The vehicle guidance device according to claim 1, wherein
the instructions further cause the processor to receive vehicle-related information from a data reception device that is configured to generate the vehicle-related information based on data acquired from sensors of vehicles other than the host vehicle, and
the emergency evacuation site and the evacuation travel route are determined based on the vehicle-related information and the satellite data.

4. The vehicle guidance device according to claim 3, wherein the vehicle-related information includes at least one of wheel speed information and information on a friction coefficient between a road and a wheel.

5. The vehicle guidance device according to claim 1, wherein the driving assistance control is executed based on the satellite data without using information acquired by an obstacle detection sensor provided in the host vehicle.

6. The vehicle guidance device according to claim 1, wherein the instructions cause the processor to determine that the abnormality is present in the braking device when the braking device fails to apply the braking force to the host vehicle upon depression of a brake pedal.

7. The vehicle guidance device according to claim 4, wherein the instructions further cause the processor to
- determine whether the received vehicle-related information includes slip information, the slip information indicating a slippery road where the friction coefficient is equal to or smaller than a threshold value,
- set the evacuation travel route that does not include the slippery road in a case where the received vehicle-related information includes the slip information.

8. The vehicle guidance device according to claim 3, wherein
the instructions further cause the processor to:
- determine one or more potential places for the emergency evacuation site based on the received satellite data; and
- receive information on one or more additional potential places for the emergency evacuation site from the data reception device, and
the emergency evacuation site is determined from among the one or more potential places and the one or more additional potential places.

9. The vehicle guidance device according to claim 8, wherein:
- the one or more potential places include a place reachable via a road with low traffic volume; and
- the one or more additional potential places include a place where the host vehicle is able to stop by causing a wheel of the host vehicle to contact a curbstone of a road.

10. The vehicle guidance device according to claim 8, wherein the instructions cause the processor to determine the emergency evacuation site based on a size and a type of each of the one or more potential places and the one or more additional potential places.

11. The vehicle guidance device according to claim 8, wherein the instructions further cause the processor to:
- display information on the one or more potential places and the one or more additional potential places on an onboard display mounted on the host vehicle; and
- determine the emergency evacuation site based on a selection made by an occupant via the onboard display that displays the information on the one or more potential places and the one or more additional potential places.

* * * * *